US011522795B1

(12) United States Patent
Lohiya et al.

(10) Patent No.: US 11,522,795 B1
(45) Date of Patent: *Dec. 6, 2022

(54) END TO END APPLICATION IDENTIFICATION AND ANALYTICS OF TUNNEL ENCAPSULATED TRAFFIC IN THE UNDERLAY

(71) Applicant: Juniper Networks, Inc., Sunnyvale, CA (US)

(72) Inventors: Anil Lohiya, Cupertino, CA (US); Amit Shukla, Sunnyvale, CA (US); Rahul Kasralikar, San Jose, CA (US); Steven Xu, Saratoga, CA (US); Amit Srivastav, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/775,897

(22) Filed: Jan. 29, 2020

Related U.S. Application Data (63) Continuation of application No. 14/231,230, filed on Mar. 31, 2014, now Pat. No. 10,594,604.

(60) Provisional application No. 61/888,263, filed on Oct. 8, 2013.

(51) Int. Cl.
  *H04L 45/74* (2022.01)
(52) U.S. Cl.
  CPC ................... *H04L 45/74* (2013.01)
(58) Field of Classification Search
  CPC ..................................................... H04L 45/74
  See application file for complete search history.

(56) References Cited

U.S. PATENT DOCUMENTS

| | | | |
|---|---|---|---|
| 7,760,636 B1 | 7/2010 | Cheriton | |
| 8,806,528 B1* | 8/2014 | Streeter | H04N 21/2668 725/32 |
| 8,892,706 B1 | 11/2014 | Dalal | |
| 9,386,458 B1* | 7/2016 | Hui | H04W 80/04 |
| 2001/0011301 A1* | 8/2001 | Sato | H04L 65/80 709/219 |
| 2004/0170133 A1 | 9/2004 | Oguchi et al. | |
| 2006/0187942 A1 | 8/2006 | Mizutani et al. | |
| 2007/0002850 A1* | 1/2007 | Guichard | H04L 69/161 370/389 |
| 2007/0112972 A1* | 5/2007 | Yonge | H04L 9/0637 709/231 |
| 2007/0171851 A1* | 7/2007 | Beckmann | H04W 12/041 370/328 |

(Continued)

*Primary Examiner* — Ajit Patel
*Assistant Examiner* — Wilfred Thomas
(74) *Attorney, Agent, or Firm* — Cooley LLP (57) ABSTRACT

In some embodiments a method includes receiving, at a first network device, a data unit to be sent to second network device via a tunnel, the data unit associated with an application. The method includes appending, to the data unit, an encapsulation header that includes a first portion configured such that the second network device is configured to forward the data unit based on the second portion of the encapsulation header that is configured to identify the application. The method includes sending, from the first network device to the second network device via a first portion of the tunnel, the data unit such that the second network device appends the encapsulation header to the data unit prior to forwarding the data unit via a second portion of the tunnel.

20 Claims, 5 Drawing Sheets

(56) References Cited

U.S. PATENT DOCUMENTS

| | | |
|---|---|---|
| 2008/0165964 A1 | 7/2008 | Lewis et al. |
| 2008/0177896 A1* | 7/2008 | Quinn ................. H04L 67/2814 709/238 |
| 2011/0122893 A1* | 5/2011 | Kang ...................... H04L 69/22 370/477 |
| 2012/0008513 A1* | 1/2012 | Baek ..................... H04L 43/028 370/252 |
| 2013/0007119 A1 | 1/2013 | Zarka et al. |
| 2013/0077624 A1* | 3/2013 | Keesara ............. H04L 12/4633 370/390 |
| 2013/0100858 A1 | 4/2013 | Kamath et al. |
| 2013/0136128 A1 | 5/2013 | Robinson et al. |
| 2013/0294449 A1* | 11/2013 | Kim ..................... H04L 43/026 370/392 |
| 2014/0050223 A1* | 2/2014 | Foo ........................ H04L 45/74 370/400 |
| 2014/0059537 A1* | 2/2014 | Kamble ................. H04L 12/18 718/1 |
| 2014/0269705 A1 | 9/2014 | DeCusatis et al. |
| 2014/0280838 A1* | 9/2014 | Finn ........................ H04L 49/00 709/223 |
| 2014/0282823 A1 | 9/2014 | Rash et al. |
| 2015/0063158 A1 | 3/2015 | Nedeltchev et al. |
| 2015/0074286 A1* | 3/2015 | Anschutz ................ H04L 45/38 709/240 |
| 2015/0207675 A1 | 7/2015 | Hayashi |
| 2015/0222489 A1* | 8/2015 | Perez Martinez .. H04L 41/0893 370/328 |
| 2015/0365316 A1* | 12/2015 | Liao ........................ H04L 45/16 709/223 |
| 2015/0365734 A1* | 12/2015 | Nordlund ............... H04H 60/73 725/54 |

\* cited by examiner

END TO END APPLICATION IDENTIFICATION AND ANALYTICS OF TUNNEL ENCAPSULATED TRAFFIC IN THE UNDERLAY

CROSS-REFERENCE TO RELATED APPLICATION

This application is a continuation of U.S. patent application Ser. No. 14/231,230, now U.S. Pat. No. 10,594,604, entitled "End to End Application Identification and Analytics of Tunnel Encapsulation Traffic in the Underlay," filed Mar. 31, 2014, which claims priority to and benefit of U.S. Provisional Patent Application No. 61/888,263, filed Oct. 8, 2013, and entitled "End to End Application Identification and Analytics of Tunnel Encapsulation Traffic in the Underlay," each of which is herein incorporated by reference in its entirety.

BACKGROUND

Some embodiments described can solve the problem of identification of applications in the physical network (or the underlay) for the tunnel encapsulated traffic from the end host device (e.g. a virtual machine (VM) or standalone host or server). This can allow underlay nodes (e.g. switches, routers) to have the visibility into the application being transported thereby providing underlay nodes with the capability to do application specific processing, e.g., analytics, class of service (cos), policy control etc. Such embodiments may not require deep packet inspection of tunneled packets on the underlay nodes and the application identification can be completely user controlled, i.e., user can choose to enable only certain applications in the network for the identification and subsequent analytics collection purposes.

Since overlay networks can involve some type of tunnel encapsulations, e.g., Generic Routing Encapsulation (GRE), Network Virtualization using Generic Routing Encapsulation (NVGRE), Virtual Extensible Local Area Network (VxLAN), etc., when an end device application traffic (i.e., the payload) is encapsulated with overlay encapsulation and sent over the physical network (the underlay), the underlay nodes (e.g., switches, routers) can lose the visibility into the type of application traffic being carried inside the tunnel header unless the nodes do the expensive operation of deep packet inspection on the packet. In absence of any application specific knowledge corresponding to the flows being transported through, underlay nodes are not required to do the application tracking or analytics in the physical network for the particular application(s), e.g., application specific cos policies, policy control, analytics collection can be difficult in the underlay nodes. Hence, this disclosure describes a method to solve the application identification problem on the underlay nodes in a layer-3 network.

One known solution is to identify the application ID in which the underlay networks have relied upon doing a deep packet inspection on every node in the path from the source to the destination. The problem with the deep packet inspection solutions are that 1) these are expensive operations, e.g., increased processing time or require new hardware, to do on a per-packet basis on every node involved in the path from the source to the destination, 2) the existing hardware in the network has to be capable of doing deep packet inspection otherwise hardware upgrade in the network is typically needed.

SUMMARY

In some embodiments, a method includes receiving, at a first network device, a data unit to be sent to second network device via a tunnel, the data unit associated with an application. The method includes appending, to the data unit, an encapsulation header that includes a first portion of a field configured such that the second network device is configured to forward the data unit based on a second portion of the field of the encapsulation header that is configured to identify the application. The method includes sending, from the first network device to the second network device via a first portion of the tunnel, the data unit such that the second network device appends the encapsulation header to the data unit prior to forwarding the data unit via a second portion of the tunnel.

DETAILED DESCRIPTION

In some embodiments, a method includes receiving, at a first network device, a data unit to be sent to second network device via a tunnel, the data unit associated with an application. The method includes appending, to the data unit, an encapsulation header that includes a first portion of a field configured such that the second network device is configured to forward the data unit based on a second portion of the field of the encapsulation header that is configured to identify the application. The method includes sending, from the first network device to the second network device via a first portion of the tunnel, the data unit such that the second network device appends the encapsulation header to the data unit prior to forwarding the data unit via a second portion of the tunnel.

In some embodiments, an apparatus includes a forwarding module implemented in at least one of a processor or a memory. The forwarding module is configured to be coupled to (1) a first network device via first portion of a tunnel and (2) a second network device via a second portion of the tunnel. The forwarding module is configured to receive, at a first time, a first data unit having a header that includes a first portion of a field and a second portion of the field, the first portion of the field of the header configured to instruct the second network device to forward the data unit based on the second portion of the field of the header, the second portion of the field of the header configured to identify an application. The forwarding module is configured to forward, prior to forwarding a second data unit that was received at a second time before the first time, the first data unit via the second portion of the tunnel to the second network device based on the second portion of the field of the header.

In some embodiments, a non-transitory processor-readable medium storing code representing instructions to cause a processor to perform a process, the code comprising code to define a filter. The filter is configured to, when a first portion of a source media access control ("SMAC") address of a data unit from a set of data units matches a condition. The filter is configured to instruct a network device to identify, in a second portion of the SMAC address, an application identification from a set of applications identifications. The code to receive a first data unit from the set of data units, a first portion of a SMAC address of the first data unit matching the condition. The code to forward the first data unit including the SMAC address of the first data unit based on an identification of an application from a set of applications. The code to receive a second data unit from the set of data units, a first portion of a SMAC address of the second data unit not matching the condition. The code to forward the second data unit including a second SMAC address of the second data unit, the second SMAC address of the second data unit selected based on a manufacturer identification of the network device.

As described herein, application identification systems can append an application identification into, for example, a tunnel encapsulation header of a data unit such that forwarding nodes can identify an application and forward the data unit based at least in part on the application. In such embodiments, an application can be, for example, a voice application that may be higher priority and/or otherwise time-sensitive. In some embodiments, because each application can include a unique application identification, each application can be associated with any number of priority levels, quality of service levels, or the like and can be forwarded by a forwarding node, based on that application identification for example, in a particular order. In some embodiments, in combination with the analytics described herein, a forwarding node can use the application identification in combination with other analytics, for example, a number of data units counted from a particular data flow, to determine forwarding order and/or direction.

Figure 1:
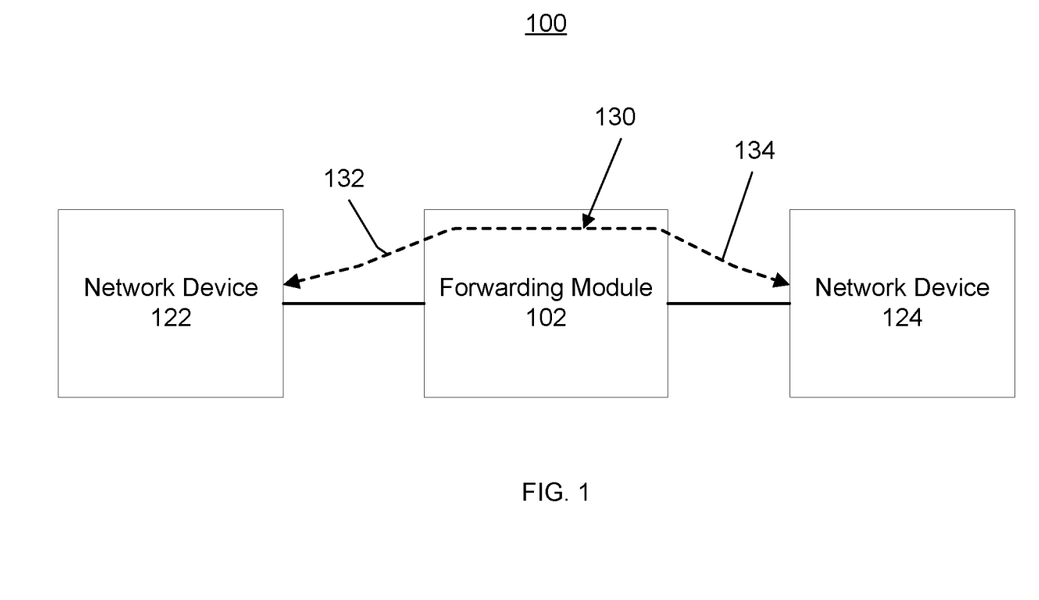
FIG. 1 is a schematic diagram of an application identification system according to an embodiment.

As shown in FIG. 1, an application identification system 100 includes a forwarding module 102 and defines a tunnel 130 that operates as a layer-3 overlay network to couple a network device 122 to a network device 124. In such an embodiment, forwarding module 102 can be a forwarding node of tunnel 130. As shown in FIG. 1, a first portion 132 of tunnel 130 operatively couples network device 122 to forwarding module 102, and a second portion 134 of tunnel 130 operatively couples network device 124 to forwarding module 102. Network devices 122, 124 can be, for example, a switch, a virtual switch, or a router, that can act as a forwarding node in a network (not shown). Network devices 122, 124 can include an application-specific integrated circuits (ASIC), field programmable gate array (FPGA), digital signal processor (DSP), etc, and can perform switching, e.g., layer-2 and layer3 data packet switching, route lookups, and packet forwarding. While not shown in FIG. 1, any number of forwarding nodes can be represented within first portion 132 of tunnel 130 and/or second portion 134 of tunnel 130. Tunnel 130 can use Ethernet over Internet protocol (IP)/ generic routing encapsulation (GRE) tunnels, virtual extensible local area network (VXLAN) encapsulation tunnels, or the like, to act as a forwarding plane between nodes.

Forwarding module 102 can be included in a network device (not shown), for example a switch, a virtual switch, or a router, that can act as a forwarding node in the network. Forwarding module 102 can include, for example, application-specific integrated circuits (ASIC), field programmable gate array (FPGA), digital signal processor (DSP), etc, and can perform switching, e.g., layer-2 and layer3 data packet switching, route lookups, and packet forwarding. In some embodiments, forwarding module 102 can be integrated within the processor of the network device. Forwarding module 102 can perform a process and/or program to combine identify applications and forward data unit in accordance with the identity of an application. The process and/or program can be a software embodied in a memory, for example, a non-transitory processor-readable medium storing code representing instructions to cause the forwarding module 102 to implement the program. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks, Read-Only Memory (ROM) and Random-Access Memory (RAM) devices.

System 100 can use an application-specific media access control (MAC) address as the source MAC (SMAC) address in the outer Ethernet header (of a tunnel encapsulated packet) instead of an interface specific or a global MAC address of network device 122, network device 124, and/or forwarding node 102. An application-encoded MAC address can be available to the first hop forwarding node, for example, network device 122; the forwarding path can be programmed end-to-end such that all nodes use the application-encoded MAC address as the SMAC address in the outer Ethernet header of a data unit transiting tunnel 130. Each forwarding node, for example, forwarding module 102 and other forwarding nodes (not shown) within the tunnel 130, during layer-3 forwarding processing, can recognize that the SMAC address field in the outer Ethernet header has the application ID encoded in it, and can use the same SMAC address as its own SMAC address when forwarding the packet further up to the nexthop node. If all the forwarding nodes in the path from the source host to the destination host follow the same logic, then the application ID can be extracted at every forwarding node just by inspecting the SMAC address field in the outer Ethernet header and analytics can be done.

Figure 4:
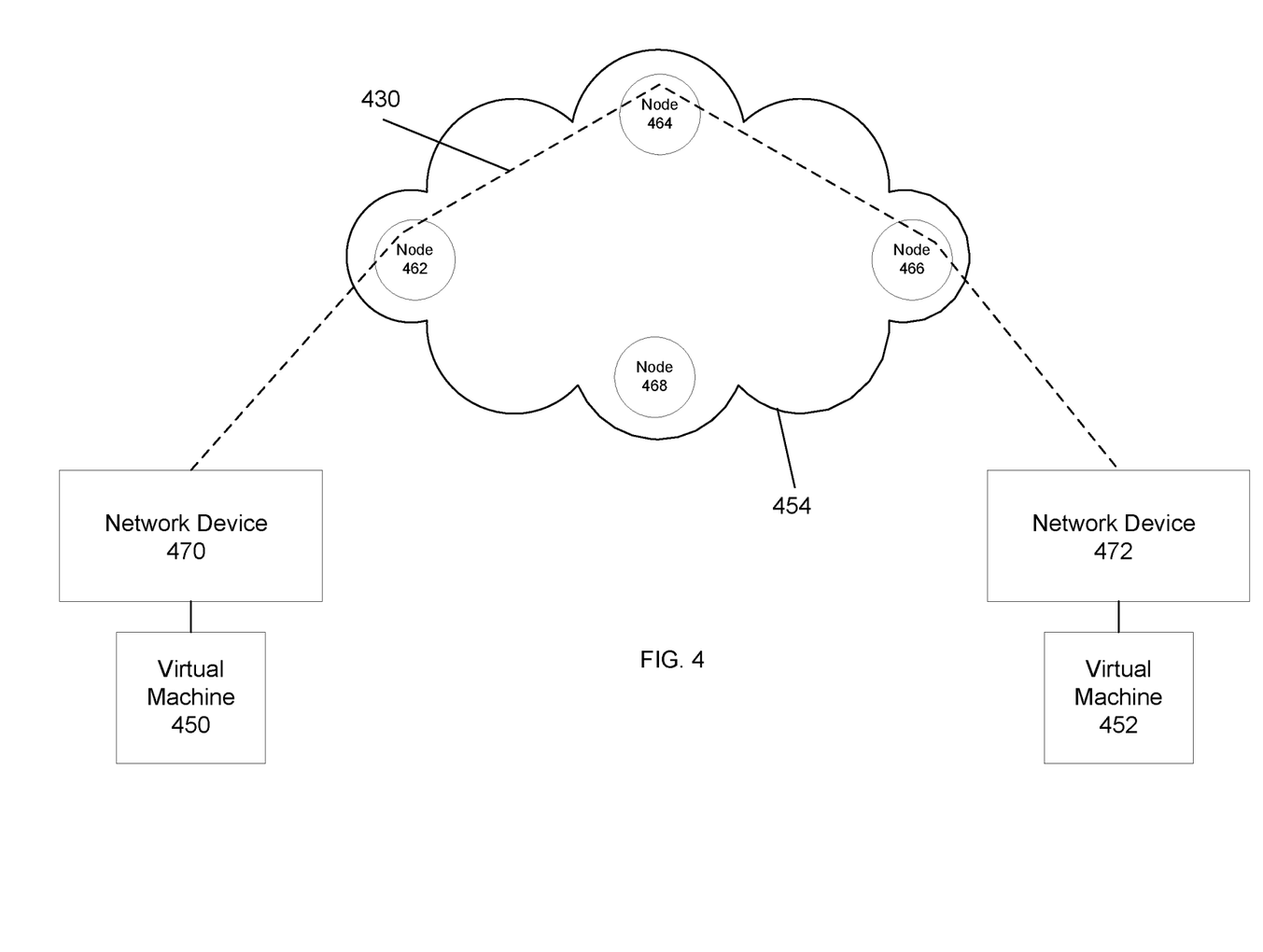
FIG. 4 is an illustration of an application identification system according to an embodiment.
Figure 5:
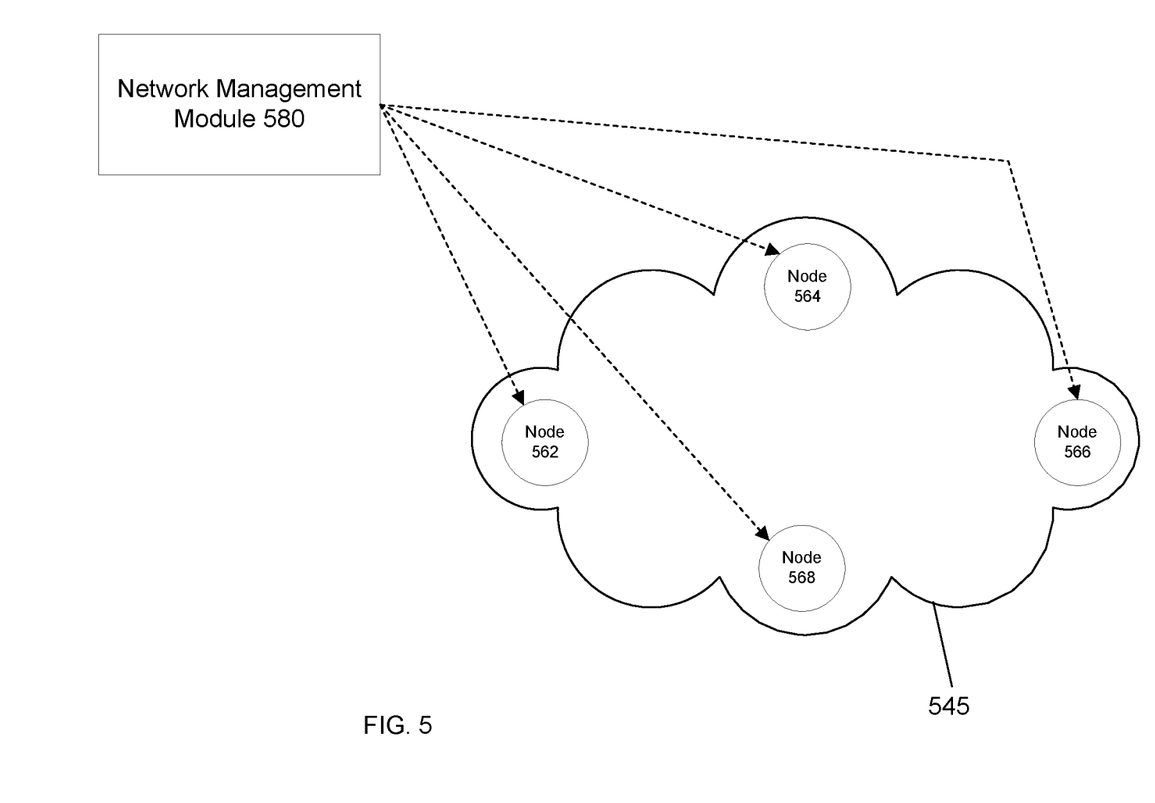
FIG. 5 is an illustration of a filter configuration system according to an embodiment.

Application identification systems and methods described herein can include three aspects: generation of application specific MAC addresses (see, e.g., FIGS. 2 and 3), using the application specific MAC addresses for forwarding, (see, e.g., FIG. 4), and configuration of forwarding nodes, (see, e.g., FIG. 5).

Figure 2:
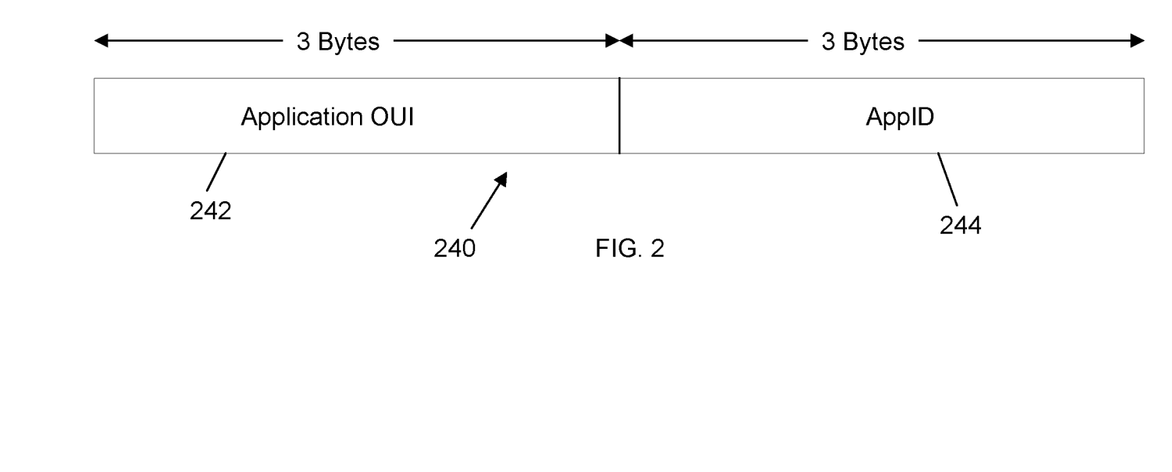
FIG. 2 is a diagram of a first instance of an application identification header according to an embodiment.
Figure 3:
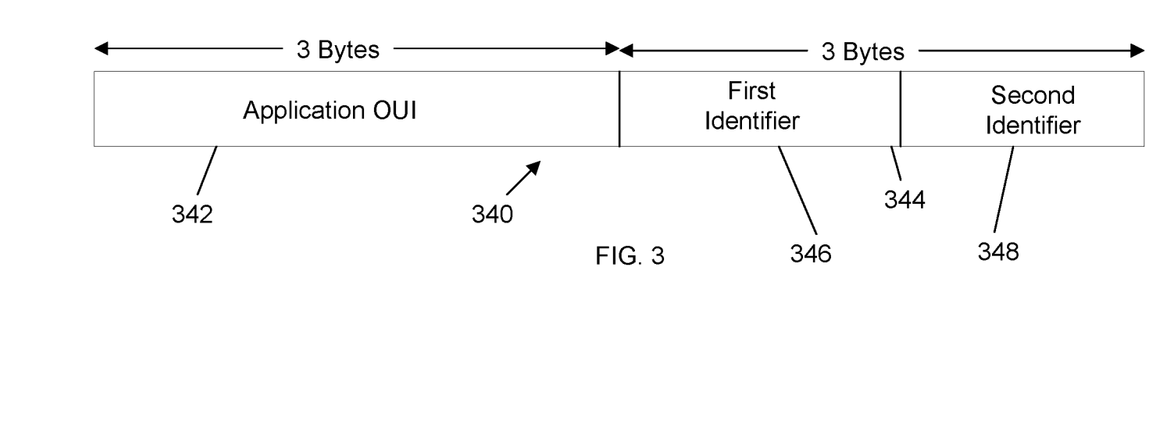
FIG. 3 is a diagram of a second instance of an application identification header according to an embodiment.

As described above, the first aspect can relate to application specific MAC address generation—e.g., generate an application specific MAC address and use this MAC as the SMAC address in the outer Ethernet header for encapsulated traffic. FIGS. 2 and 3 each depict a portion of a SMAC address according to an embodiment. An application specific MAC address can be generated by encoding the application ID into the MAC address field of the Ethernet header. As shown in FIG. 2, SMAC header portion 240 can include an upper three byte portion 242 and a lower three byte portion 244. As shown in FIG. 2, upper three byte portion 242 can include an application organizationally unique identifier (OUI), and lower three byte portion 244 can include an application identifier (AppID). When a forwarding node reads the application OUI of a data unit, the forwarding node can follow instruction(s), for example based on a filter, to forward the data unit based on the AppID. In some embodiments, the application OUI can be the same for all data units in a given application identification system. In such embodiments, the AppID can be unique for each application. As shown in FIG. 3, SMAC header portion 340 can include an upper three byte portion 342 and a lower three byte portion 344. As shown in FIG. 3, upper three byte portion 342 can include an application organizationally unique identifier (OUI). In some embodiments, the lower three byte of application ID can include more than one identifier. For example, as shown in FIG. 3, lower three byte portion 344 includes two identifiers e.g. First Identifier 346 and Second Identifier 348. In such embodiments, First Identifier 346 can include, for example, a virtual machine ID, hypervisor ID, destination application ID, or any other ID that a user wants to use for identification. Similarly, Second Identifier 348 can include a value to define application ID, a source specific application ID, etc. In some embodiments lower three byte portion 344 can include more or fewer identifiers, and the identifier can be of different combinations of identifiers based on, among other things, a particular configuration of a system, filters, and/or forwarding nodes.

As described above, the second aspect can relate to using application specific MAC as the SMAC address. For example, when an application specific MAC address (e.g., a MAC address having a MAC address portion that includes an application OUI and AppID) is generated, the first hop forwarding node can use this as the SMAC address in the outer Ethernet header of a tunnel encapsulated packet. Thereafter each forwarding node can recognize the application specific MAC in the outer Ethernet header of the incoming packet on its input interface and can use the same MAC address when forwarding this traffic to the nexthop node towards the destination, hence carrying the AppID end to end. The forwarding node at the forwarding layer can be programmed either dynamically or statically to use the application specific MAC as the source MAC in the outer Ethernet header. Use of SMAC address can be different from the regular layer-3 forwarding in different ways. In one way, in regular layer-3 forwarding, a node can use its interface specific MAC or the global MAC as the SMAC in the Ethernet header when forwarding the packets to the next node but some embodiments herein can use application specific MAC address as the SMAC. In a second way, because some embodiments herein can use application specific MAC as SMAC on nodes, a node can use different SMAC for multiple application flows going out the same interface; this can be different than the regular layer-3 forwarding where the SMAC address for the packets going out an interface is always the same for different flows. Moreover, all the nodes in the forwarding path can use the same application specific MAC as SMAC for an application flow as opposed to the SMAC changing at every hop in the regular layer-3 forwarding.

As shown in FIG. 4, a first virtual machine (VM) 450, that is instantiated in a first virtual server (not shown) can communicate, via first network device 470 and a second network device 472, with a second VM 452, that is instantiated in a second network device 472, over an internet protocol (IP) fabric 454. In some embodiments, either of network device 470 or network device 472 can be, for example, physical or virtual switch. Similarly, in some embodiments, either of VM 450 or VM 452 can be included in an end host device, for example a physical host. Said another way, either of VM 450 or VM452 can be instantiated by a virtual server located on a physical host. When first VM 450 generates traffic, first VM 450 can associate each data unit with MAC addresses in the Ethernet header, specifically, first VM 450 can associate source MAC as, for example, VM1-MAC, and destination MAC as, for example, VM2-MAC. Similarly, an IP header of a data unit from the generated traffic can have a source IP as, for example, VM1-IP, and a destination IP as, for example, VM2-IP. In this example, the nodes 462, 464, 466, 468 can be forwarding nodes (e.g., switches, routers) in IP fabric 454, and there can be a tunnel 430 between node 462 and node 466 that can form an overlay for traffic between first VM 450 and second VM 452. When a data unit generated by first VM 450 is sent, first network device 470 can append a header, for example an encapsulation header including an application OUI and an AppID prior to forwarding the data unit to node 462. First network device 470 can send the data unit to node 462. Node 462 can receive the data unit and can reference the header to determine where to forward the data unit. Because the header includes the application OUI, node 462 can reference the AppID in the header and, based on the AppID can forward the data unit to node 464. Node 464 can similarly reference the header of the data unit and forward the data unit to node 466 and second network device 472, respectively. At each hop, between first network device 470 and second network device 472, each of first network device 470, second network device 472, and nodes 462, 464 and 466 can use the same header, e.g., the same application OUI and the same AppID. In this manner, data units from different data flow can be forwarded and prioritized based on the application and/or type of data without the need for deep packet inspection. In some embodiments, a forwarding node can use the application OUI and/or AppID for analytics, e.g., counting, sampling, etc.

The third aspect can relate to configuration of forwarding nodes—e.g., generation of the configuration used for application identification, distribution of such configurations to the forwarding nodes, and programming the forwarding nodes within the forwarding path. Application specific MAC addresses, mapping of end-host to the application ID, filter configuration to do analytics based on application specific MAC address match, filter configuration for the nexthop manipulation on the underlay nodes can be used for the three aspects to work. Application specific MAC address can be distributed by a central management station (for example a network management module) to all the nodes or alternatively application IDs, and application specific OUI can be distributed to the nodes and then each node can compute the application specific MACs. On the first hop node that has the end-host directly connected, there can be additional configuration used to map end-host to the application ID (or application specific MAC). Similarly, filter configurations per application can either be generated by the management station or it can be generated dynamically on each forwarding node. Filter configuration is a mechanism to recognize application specific MAC, modify the nexthop, and perform the analytics on the application flows.

As described herein, when a packet addressed to a destination end host (or VM) is received on a forwarding node (e.g., vSwitch, router, switch), the nexthop towards the destination can be obtained through the normal layer-3 forwarding lookup. If the destination host is reachable over a tunnel, then the layer-3 lookup on the forwarding node can append a tunnel header to the host generated packet, perform another lookup on the tunneled packet to find the nexthop node in the underlay network, and send the packet to the nexthop node. The outer Ethernet header (i.e., the underlay Ethernet header) can contain the destination MAC (DMAC) address corresponding to the MAC address of the nexthop node. The SMAC address in the outer Ethernet header can be that of local interface MAC address or the global MAC address of the forwarding node itself. To use the application specific MAC as the SMAC in outer Ethernet header on first hop node, an application identification system can maintain some mapping (e.g. end-host to application ID mapping) so, that each node can use the correct application specific MAC as SMAC when building the outer Ethernet header.

In some embodiments, to recognize the application encoded MAC address, e.g., an application OUI and an AppID, in the incoming packet on the underlay nodes, and to use that application encoded MAC address as a node's own SMAC address when forwarding to nexthop node, each forwarding node along a forwarding path on each node can configured, for example with filters and/or other forwarding instructions. In some embodiments, the forwarding nodes in the underlay that are used to carry the overlay traffic can be configured with a filter to identify that when the incoming traffic has the application OUI then the traffic should be forwarded based on the AppID in the encoded MAC as the SMAC (in the outer Ethernet header)

In some embodiments, filters can be configured either through a network management module or the filters can be generated dynamically on the node itself. In embodiments where the filters can be dynamically-generated, the nodes may need to know the AppIDs as well as the application Organizationally Unique Identifier (OUI) (upper 3 bytes of the MAC address) that can be used to carry the application ID. At each node, filters are programmed into the forwarding layer. As shown in FIG. 5, a network management module 580 can be operatively coupled to an IP fabric 554, similar to IP fabric 454, and that includes nodes 562, 564, 566 and 568, similar to nodes 462, 464, 466 and 468. When a new filter is generated by network management module 580, network management module 580 can broadcast the new filter to each of nodes 562, 564, 566 and 568. In some embodiments, a new filter can be generated, for example, when new physical or virtual machine and/or switches are added to a network, when new application flows are anticipated, etc.

In some embodiments, a filter can be satisfied with the input match condition as the source MAC address (of the outer Ethernet header) and certain matching actions; there can be one matching action to modify the nexthop on the route, and the other matching actions could be packet counting, sampling of the packet (for the analytics purposes), etc. Thus, there can be at least one unique firewall filter per application.

In such embodiments, a purpose of the modification of the nexthop on a route can be to be able to use the incoming SMAC in the outer Ethernet header instead of selecting an interface MAC address or global MAC address on the forwarding node. The nexthop on the route can be either modified during packet processing to carry the incoming SMAC or a pair of nexthops for a route can be statically defined—one regular nexthop, other 'modified nexthop' (that changes the SMAC); determination of which of the nexthops to install in the forwarding layer can be done via filtering configuration.

Figure 6:
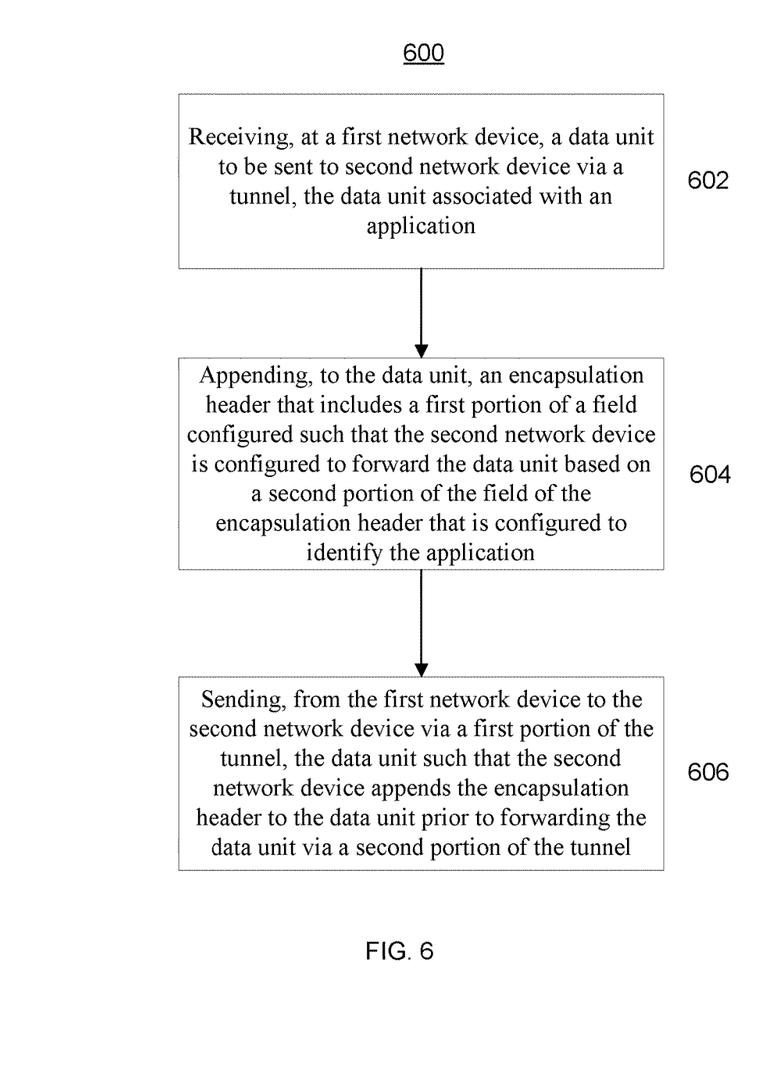
FIG. 6 is a flowchart depicting a method of operating an application identification system according to an embodiment.

FIG. 6 is a flowchart illustrating a method 600 of operating an application identification system as described herein. Method 600 includes receiving, at a first network device, a data unit to be sent to second network device via a tunnel, the data unit associated with an application, at 602. Method 600 includes appending, to the data unit, an encapsulation header that includes a first portion configured such that the second network device is configured to forward the data unit based on the second portion of the encapsulation header that is configured to identify the application. Method 600 includes sending, from the first network device to the second network device via a first portion of the tunnel, the data unit such that the second network device appends the encapsulation header to the data unit prior to forwarding the data unit via a second portion of the tunnel.

In some embodiments, because forwarding nodes of the application identification systems described herein may not perform deep packet inspection the system can be more cost effective than a system that performs deep packet analysis at each forwarding node. Said another way, in some embodiments, the application identification systems described herein can identify a type of data in a data unit, for example, based on an AppID, by only inspecting a data unit's IP header, and not having to inspect a second header, for example, a TCP header, and not having to inspect the data part of the data unit, for example, deep packet inspection. Also, because deep packet inspection is not required on a per-packet basis on every node in the path; the throughput performance on the nodes may be impacted less. In some embodiments, existing hardware can be configured to perform the methods described herein, accordingly, hardware upgrades may not be required. The application identification systems and method described herein can be encapsulation agnostic i.e., the application identification systems and method described herein may not require different code base for different overlay encapsulation types. The application identification systems and methods described herein also can allow end-to-end application trackability in the underlay network on-demand basis. The application identification systems and methods described herein can be integratable with external partners as well as open source code.

It is intended that the systems and methods described herein can be performed by software (stored in memory and/or executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including Unix utilities, C, C++, Java™, Ruby, SQL, SAS®, the R programming language/software environment, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code. Each of the devices described herein, for example, devices S1, S2, and S3, nodes, servers and/or switches, etc can include one or more processors as described above.

Some embodiments described herein relate to devices with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein. Each of the devices described herein, for example, nodes 462, 464, 466 and 468, other nodes, servers and/or switches, etc can include one or more memories and/or computer readable media as described above.

While various embodiments have been described above, it should be understood that they have been presented by way of example only, and not limitation. Where methods and steps described above indicate certain events occurring in certain order, the ordering of certain steps may be modified. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein. Furthermore, although various embodiments are described as having a particular entity associated with a particular compute device, in other embodiments different entities can be associated with other and/or different compute devices.

What is claimed is:

1. A method, comprising:
    receiving, at a first network device, a first data unit and a second data unit to be sent to a second network device;
    appending an encapsulation header to the first data unit such that the second network device is configured to forward the first data unit based on the encapsulation header;
    sending, from the first network device to the second network device, the first data unit such that the second network device appends the encapsulation header to the first data unit prior to forwarding the first data unit;
    performing, at the first network device, analytics on the first data unit and the second data unit based on the encapsulation header, the analytics including extracting a first identifier of a first application based on the encapsulation header of the first data unit, the first identifier of the first application identifying an application associated with the first data unit, and extracting a second identifier of a second application, the second identifier of the second application identifying an application associated with the second data unit; and
    determining a forwarding order for a plurality of data units received at the first network device based on the first identifier and the second identifier, the plurality of data units including the first data unit and the second data unit, the analytics being performed without inspection of a Transmission Control Protocol (TCP) header and without deep packet inspection,
    the analytics include filtering the plurality of data units based on an application identifier from a plurality of application identifiers that is in a plurality of encapsulation headers, each application identifier from the plurality of application identifiers associated with a data unit from the plurality of data units.

2. A method, comprising:
    receiving, at a first network device, a first data unit to be sent to a second network device;
    appending an encapsulation header to the first data unit such that the second network device is configured to forward the first data unit based on the encapsulation header;
    sending, from the first network device to the second network device, the first data unit such that the second network device appends the encapsulation header to the first data unit prior to forwarding the first data unit;
    performing, at the first network device, analytics on the first data unit based on the encapsulation header, the analytics including extracting an identifier of an application based on the encapsulation header of the first data unit, the identifier of the application identifying an application associated with the first data unit; and
    determining a forwarding order for a plurality of data units received at the first network device based on the analytics, the plurality of data units including the first data unit, the analytics being performed without inspection of a Transmission Control Protocol (TCP) header and without deep packet inspection,
    the analytics include filtering the plurality of data units based on an application identifier from a plurality of application identifiers that is in a plurality of encapsulation headers, each application identifier from the plurality of application identifiers associated with a data unit from the plurality of data units.

3. The method of claim 2, wherein the encapsulation header is associated with a tunnel having a first portion between the first network device and the second network device, the first portion of the tunnel being different from a second portion of the tunnel, the second portion of the tunnel including the second network device.

4. The method of claim 2, wherein:
    the first identifier of the first application being included in a portion of the encapsulation header,
    the appending including appending the encapsulation header to the first data unit such that the second network device is configured to forward the first data unit based on the first identifier of the first application included within the portion the encapsulation header.

5. The method of claim 2, wherein the encapsulation header is a virtual extensible local area network header.

6. The method of claim 2, wherein the first data unit is associated with a voice application.

7. The method of claim 2, wherein a first portion of a field of the encapsulation header is included in an upper three bytes of the encapsulation header.

8. The method of claim 2, wherein:
    a first portion of a field of the encapsulation header is included in an upper three bytes of the encapsulation header, and
    a second portion of the field of the encapsulation header is included in a lower three bytes of the encapsulation header.

9. The method of claim 2, wherein the tunnel is a layer-3 overlay between a first virtual machine and a second virtual machine.

10. The method of claim 2, wherein the encapsulation header is a generic routing encapsulation header.

11. The method of claim 2, wherein the encapsulation header does not include an interface specific organizationally unique identifier.

12. The method of claim 1, further comprising:

receiving, at the first network device, the second data unit to be sent to the second network device via the tunnel, the second data unit associated with the second application;

determining a priority of the second data unit based on a second application identifier in a second encapsulation header of the second data unit, the second application identifier indicating that the second application associated with the second data unit is a lower priority relative to the first application; and performing an action with the first data unit and the second data unit, based on the priority of the second data unit.

13. An apparatus, comprising:

a memory; and a processor operatively coupled to the memory, the processor configured to receive, at a first network device, a first data unit and a second data unit to be sent to a second network device, the processor configured to append an encapsulation header to the first data unit such that the second network device forwards the first data unit based on the encapsulation header in response to receiving the first data unit, the processor configured to send, from the first network device to the second network device, the first data unit such that the second network device appends the encapsulation header to the first data unit prior to forwarding the first data unit, the processor configured to perform, at the first network device, analytics on the first data unit and the second unit based on the encapsulation header, the analytics including extracting first identifier of first application based on the encapsulation header of the first data unit, the first identifier of the first application identifying an application associated with the first data unit, and extracting a second identifier of a second application, the second identifier of the second application identifying an application associated with the second data unit, the processor configured to determine a forwarding order for a plurality of data units received at the first network device based on the first identifier and the second identifier, the plurality of data units including the first data unit and the second data unit, the analytics being performed without inspection of a Transmission Control Protocol (TCP) header and without deep packet inspection, the analytics include filtering the plurality of data units based on an application identifier from a plurality of application identifiers that is in a plurality of encapsulation headers, each application identifier from the plurality of application identifiers associated with a data unit from the plurality of data units.

14. The apparatus of claim 13, wherein the encapsulation header is a generic routing encapsulation header.

15. The apparatus of claim 13, wherein the encapsulation header does not include an interface specific organizationally unique identifier.

16. The apparatus of claim 13, wherein:

the processor is configured to receive the second data unit to be sent to the network device via a tunnel, the second data unit associated with the second application, the processor is configured to determine a priority of the second data unit based on a second application identifier in a second encapsulation header of the second data unit, the second application identifier indicating that the second application associated with the second data unit is a lower priority relative to the first application, the processor is configured to perform an action with the first data unit and the second data unit, based on the priority of the second data unit.

17. The apparatus of claim 13, wherein the first encapsulation header is a virtual extensible local area network header.

18. The apparatus of claim 13, wherein the tunnel is a layer-3 overlay between a first virtual machine and a second virtual machine.

19. The apparatus of claim 13, wherein the encapsulation header is associated with a tunnel having a first portion between the first network device and the second network device, the first portion of the tunnel being different from a second portion of the tunnel, the second portion of the tunnel including the second network device.

20. The method of claim 2, wherein sending the first data unit includes sending the first data unit from the first network device to the second network device via a first portion of a tunnel such that the second network device forwards the first data unit via a second portion of the tunnel.

* * * * *